United States Patent [19]

Zomorodi et al.

[11] 4,440,815

[45] Apr. 3, 1984

[54] CLEAR, AUTOCLAVABLE PLASTIC FORMULATION FOR MEDICAL LIQUID CONTAINERS

[75] Inventors: Mostafa Zomorodi, Gurnee, Ill.; Alan J. Trieber, Seabrook, N.H.

[73] Assignee: Abbott Laboratories, North Chicago, Ill.

[21] Appl. No.: 530,444

[22] Filed: Sep. 8, 1983

Related U.S. Application Data

[63] Continuation-in-part of Ser. No. 278,253, Jun. 29, 1981, abandoned.

[51] Int. Cl.³ .................. C08L 53/02; C08L 53/00; C08L 23/08; C08L 23/12
[52] U.S. Cl. .................................. 428/35; 524/505; 525/93; 525/98; 525/227
[58] Field of Search ............... 525/93, 227; 524/505; 428/35

[56] References Cited

U.S. PATENT DOCUMENTS

| 3,361,852 | 2/1968 | Bassett et al. | 525/222 |
| 3,686,364 | 8/1972 | Robinson | 260/876 B |
| 3,792,124 | 2/1974 | Davison et al. | 260/876 |
| 3,865,776 | 2/1975 | Gergen | 260/33.6 AQ |
| 3,970,719 | 7/1976 | Edmonds | 260/878 B |
| 4,000,341 | 12/1976 | Matson | 428/36 |
| 4,048,254 | 9/1977 | Hillier et al. | 260/859 R |
| 4,107,130 | 8/1978 | Gergen et al. | 525/96 |
| 4,140,162 | 2/1979 | Gajewski et al. | 150/1 |
| 4,210,579 | 7/1980 | Grigo et al. | 525/88 |
| 4,277,578 | 7/1981 | Yoshimura et al. | 525/211 |
| 4,317,764 | 3/1982 | Sheer | 525/166 |

OTHER PUBLICATIONS

"Extruding EMA Copolymer: A Processors' Guide", Plastics Tech., Feb. 1980. "Kraton ® G-2705 Thermoplastic Rubber", Tech. Bullet. Shell Chem. Co., SC:40-77.
"New TP Elastomer Families: A Look at What's in R&D", Process Eng. News, Mar. 81.

Primary Examiner—Carman J. Seccuro
Attorney, Agent, or Firm—Neil E. Hamilton

[57] ABSTRACT

A clear, flexible, thermoplastic material capable of being processed into hollow shapes by conventional thermoplastic processing methods and subsequently autoclaved, comprises four components: from about 45 to 70% by weight of a polyolefin polypropylene, including its copolymers, admixed with from; about 5 to 25% by weight of an ethylene loweralkyl acrylate polymer from; about 10 to 40% by weight of a thermoplastic ethylene butylene block copolymer elastomer having terminal polystyrene blocks; and from 0 to 15% of a high-boiling point petroleum distillation byproduct as represented by mineral oil. The above material is particularly desirable for manufacturing medical liquid containers such as autoclavable, flexible, collapsible, intravenous solution containers.

9 Claims, No Drawings

CLEAR, AUTOCLAVABLE PLASTIC FORMULATION FOR MEDICAL LIQUID CONTAINERS

CROSS REFERENCE TO RELATED APPLICATIONS

This is a continuation-in-part of patent application Ser. No. 06/278,253 filed June 29, 1981 entitled "Clear Autoclavable Thermoplastic Formulation for Medical Liquid," now abandoned.

BACKGROUND OF THE INVENTION

The present invention relates generally to medical plastic formulations and particularly to medical liquid containers such as flexible, collapsible, intravenous solution containers. The materials disclosed exhibit the particular advantages of being essentially transparent, soft and flexible, essentially free of extractables, and able to resist high temperatures present in autoclaving.

Various materials have been utilized for intravenous solution containers in the past. In particular, U.S. Pat. No. 4,140,162 discloses a formulation for medical liquid containers containing both polypropylene and a block copolymer. A third ingredient disclosed comprises polyethylene or polyethylene vinyl actate. The present invention is distinguished from the '162 patent by the use of ethylene methyl acrylate, which is lower in cost and provides more desirable physical properties such as improved thermal stability and a wider range of processing temperatures. Other formulations of block copolymers which include polypropylene may be found in U.S. Pat. No. 3,792,124. These formulations are not suitable for flexible medical liquid containers, however, in that they are ionic, which would alter the solutions contained therein.

SUMMARY OF THE INVENTION

In accordance with this invention, a clear, flexible, plastic material is provided, capable of being processed into hollow shapes by conventional thermoplastic processing methods and subsequently autoclaved. The material comprises: (A) from about 45 to 70% by weight of a polypropylene polyolefin, including its copolymers, admixed with from; (B) about 5 to 25 by weight of an ethylene loweralkyl acrylate; (C) from about 10 to 40% by weight of an ethylene butylene block copolymer having terminal polystyrene units; and from about 0 to 15% of a high boiling point petroleum distillation by-product or represented by mineral oil.

Ingredient (A) as described above is a polypropylene polyolefin (PP). Many commercial varieties of polypropylene contain small amounts of ethylene units. However, this does not make a major impact on the properties of the propylene material for purposes of this invention.

Ingredient (B) generally comprises ethylene methyl acrylate (EMA) and is commercially available from Gulf Oil Chemicals Co., Orange, Tex., under the trade numbers 2205 and 2255. EMA is a random copolymer consisting of a polyethylene backbone with methyl acrylate side branches. Gulf's present commercial product contains approximately 20% by weight of methyl acrylate. EMA's distinguishing properties include a low melt temperature and corresponding easy heat sealability, as well as good thermal stability in the range of 600° to 630° F., and "rubbery" mechanical properties, including low stiffness, high elongation, clarity and high impact strength. A comparison of ethylene methyl acrylate to ethylene vinyl acetate (EVA) may be seen in the following Table I:

TABLE I

| | EMA | EVA |
| --- | --- | --- |
| Processing Range, F. | 300–620 | 450 Max |
| Thermal Stability | Excellent | Poor |
| Corrosive Possibility | No | Yes |
| Pellets Require Protection from Moisture During Storage | No | No |
| Moisture Barrier | Fair | Fair |
| Adhesion to Substrates: | | |
| Paper | Excellent | Excellent-Good |
| OPP | Excellent | Poor |
| Cellophane (PVDC-Coated) | Excellent | Poor |
| Aluminum Foil (Unprimed) | Poor | Poor |
| Price, ¢./lb. | 59½ | 41½-61½ |
| ¢ cu. in. | 2 | 1.4–2.0 |

The general mechanical properties of EMA may be found in Table II below when compared to low density polyethylene (LDPE):

TABLE II

| Property Comparison of EMA to LDPE | | |
| --- | --- | --- |
| | EMA | LDPE |
| Melt Index | 2.4 | 2 |
| Density, gm/cc | 0.942 | 0.917 |
| Vicat Softening Point, F. | 138 | 194 |
| Tensile Str. psi | 1620 | 1850 |
| Elongation, % | 720 | 650 |
| Hardness, Shore D | 35 | 46 |
| Flex, stiffness, psi | 4000 | 18,500 |
| Stress Crack Risist. (Hostapal, 122 F.) | No Failures | 90% Failures |
| Dielectric Constant @ 100 kHz | 3.1 | 2.3 |
| Dissipation Factor @ 100 KhZ | 0.015 | 0.0002 |
| Low Temp. Brittleness to −105 F. | Failures | Failures |
| Price, ¢/lb. | 59½ | 43½ |
| ¢/cu. in. | 2 | 1.4 |

As shown in Table II, the most notable property changes brought about by the copolymerization of ethylene with methyl acrylate are: depression of melting point, significant reduction in flexural modulus, and improvement in stress crack resistance. A key attribute of EMA resin, compared with other copolymers of low density polyethylene is EMA's great thermal stability. EMA can be processed at very high temperatures; up to 600° to 630° F. without polymer breakdown and/or chain cission. Some of the other low density polyethylene copolymers, like EVA, when mixed with high temperature-reisistent plastics such as a polypropylene and high density polyethylene and heated in excess of 450° F. begin to break down and liberate acids that attack metal surfaces of extrusion equipment.

Although EMA is the preferred embodiment of element B of the material, other loweralkyl ethylene acrylates may be utilized such as ethylene ethyl acrylate and ethylene butyl acrylate, with similar results as indicated in the Examples. By the term "loweralkyl" is meant an alkyl group having 1-5 carbon atoms, such as methyl, ethyl, butyl, etc.

The third element (C) of this novel plastic material comprises from about 10 to 40% by weight of an block copolymer thermoplastic ethylene butylene having terminal polystyrene units. Ethylene butylene block copolymers having terminal polystyrene units are commercially available under the trademark Kraton G from the Shell Chemical Co. For example, the impermeable polymeric compositions disclosed in U.S. Pat. No. 3,686,364 assigned to Polymer Corporation Limited, hereby incorporated by reference, disclose a series of hydrogenated butadiene styrene block copolymers useful as the third element in the present application. Similarly, the block copolymers disclosed in U.S. Pat. No. 3,865,776 assigned to Shell Oil Company, hereby incorporated by reference, may also be utilized. These copolymers consist of ethylene-butylene blocks with a central block comprising 50 to 80% by weight of the copolymer molecule of a rubbery olefin polymer of generally equal proportions of ethylene and butylene units and terminal blocks of polystyrene.

The fourth element (D), a high boiling point petroleum distillation byproduct in the form of mineral oil, is optional and is added to improve flexibility and clarity as well as a reduction in cost. It would be added in an amount of from 0% to about 15% by weight, either separately or with the supplied grades of Kraton G-2705. The preferred range when the mineral oil is added would be from 10 to about 15% by weight.

The following Table III discloses a series of Examples of the above listed materials, showing in particular, the proportionate percentages, by weight, of elements A, B, C and D. These Examples and those that follow are set forth for the purpose of illustrating the present invention and should not be construed to limit the invention to the precise ingredients, amounts, proportions, or other conditions specified:

TABLE III

| | Preferred Embodiments | | |
|---|---|---|---|
| | PP | EMA | EEA | KRATON* |
| Example 1 | 90% | 10% (2205) | | 30% |
| | | + 70% | | |
| Example 2 | 80% | 20% (2255 or 2205) | | 30% |
| | | + 70% | | |

TABLE III-continued

| | Preferred Embodiments | | |
|---|---|---|---|
| | PP | EMA | EEA | KRATON* |
| Example 3 | | | 30% | 30% |
| | 70% | + 70% | | |

*The particular grade of Kraton was G-2705 and contains polypropylene and approximately 42% by weight of mineral oil. This results in the final composition having the mineral oil present in an amount of approximately 12.75% by weight.

In the preferred embodiments, ethylene methyl or ethyl acrylate was mixed with the indicated percentage of polypropylene. The resulting combination was then mixed in a proportion of 70% EMA or EEA-polypropylene blend to 30% element C which contains 12.75% by weight of D. The resulting materials of these Examples exhibited the following properties, as seen in Table IV.

TABLE IV

| Injection Molded Test Bars | Control | Autoclaved | Irradiated | Irradiated and Autoclaved | Irradiated | Irradiated and Autoclaved |
|---|---|---|---|---|---|---|
| Example 1 | | | | | | |
| Tensile (psi) | 2006 | 2041 | 1947 | 1947 | 1935 | 1971 |
| Elongation (%) | 490 | 233 | 707 | 273 | 473 | 177 |
| 100% Modulus (psi) | 1909 | 2228 | 1853 | 2159 | 1948 | 2112 |
| Yield (psi) | 2066 | 2228 | 2041 | 2230 | 2065 | 2305 |
| Toughness (LD-F in/in$^3$) | 9976 | 4973 | 14097 | 5702 | 9460 | 3784 |
| Example 2 | | | | | | |
| Tensile (psi) | 1842 | 1812 | 1818 | 1795 | 1947 | 1842 |
| Elongation (%) | 520 | 440 | 587 | 367 | 600 | 383 |
| 100% Modulus (psi) | 1713 | 1883 | 1648 | 1817 | 1795 | 1842 |
| Yield (psi) | 1653 | 1787 | 1653 | 1748 | 1724 | 1760 |
| Toughness (LD-F in/in$^3$) | 9087 | 7918 | 10187 | 6501 | 11013 | 6898 |
| Example 3 | | | | | | |
| Tensile (psi) | 1994 | 1842 | 1830 | 1760 | 1771 | 1842 |
| Elongation (%) | 687 | 360 | 663 | 533 | 540 | 520 |
| 100% Modulus (psi) | 1560 | 1807 | 1490 | 1690 | 1467 | 1713 |
| Yield (psi) | 1525 | 1666 | 1525 | 1455 | 1408 | 1678 |
| Toughness (LD-F in/in$^3$) | 12088 | 6314 | 11122 | 8568 | 8583 | 9152 |

In addition, the resulting formulations were found to be highly suitable for sheet extrusion, injection molding or blow molding into flexible, transparent, autoclavable intravenous solution containers. In particular, the resulting container was found to be of sufficient strength to withstand heavy impact during shipment and use, while at the same time being sufficiently flexible to collapse easily during drainage of intravenous solution from the container.

The following examples further illustrate specific embodiments of the invention.

EXAMPLE 4

A block copolymer having thermoplastic rubber characteristics consisting essentially of a rubbery olefin polymer of generally equal proportions of ethylene and butylene units and terminal blocks of polystyrene was added to a rotational mixer in the amount of 30% by weight with 70% by weight of a blend of 80% polypropylene and 20% EMA. The block copolymer used was Kraton G-2705 sold by the Shell Oil Company. This grade of Kraton contains mineral oil and polypropylene. Mechanical properties of Kraton G-2705 are as follows:

| | |
|---|---|
| Hardness, shore A | 52 |
| Tensile properties, ASTM D-412 | |
| Tensile strength, psi | 1650 |
| Elongation at break | 800 |
| Modulus at 100% extension, psi | 200 |
| Set after break, % | 55 |
| Tear strength, pli (ASTM D-624) | 130 |
| Compression set at 70° C., % (ASTM D-395) | 32 |
| Yerzley resilience, % (ASTM D-945) | 75 |
| Specific gravity | 0.90 |

The ingredients were premixed in the rotational mixer and then introduced into an extruder for extrusion into a rod. The rods were then chopped into smaller pellet sized pieces. The chopped pellets were utilized in the commercially available blow molding apparatus, specifically a continuous extrusion machine, with a secondary blow station manufactured by Rommelag Maschinen GmbH & Company, Waiblinger W. Germany. The material was found to be successfully fabricated into a transparent, flexible, collapsible intravenous solution container which was autoclavable under a typical sterilizing cycle without any distortion.

EXAMPLE 5

The above listed percentages of components as indicated in Example 4 were duplicated utilizing as element C of the composition, a different block copolymer, said block copolymer being either a linear or a branched block copolymer having at least two polymer blocks A and at least one polymer block B, each polymer block A being selected from the group consisting of monnoalkenylarene polymers and hydrogenated products thereof wherein no more than 25% of the arene double bonds have been reduced and polymer block B is a hydrogenated polymer block of a C4-5 conjugated diene polymer wherein at least about 30% of the aliphatic unsaturation has been reduced by hydrogenation. Specifically, each polystyrene block has an average molecular weight between about 2,000 and 50,000 and the hydrogenated polybutadiene block has an average molecular weight between about 20,000 and 300,000.

EXAMPLE 6

In this Example, the same percentages of elements A and B of the composition are disclosed as in Example 4. Element C comprises 18% by weight of a thermoplastic composition comprising a block copolymer having at least two monoalkenylarene polymer blocks and at least one substantially completely hydrogenated diene polymer block. For example, polymer block A is a block copolymer having the structure polystyrene-completely hydrogenated polybutadiene-polystyrene with block molecular weights of 25,000-100,000-25,000. An alternative formulation is a block copolymer of the same structure and block identity but having block molecular weights of 10,000-50,000-10,000. An additional element D of mineral oil in an amount of 12% would be added to both formulations.

The following Examples 7 and 8 are set forth for the purpose of illustrating the use of a styrene-ethylene-butylene-styrene block copolymer without the use of mineral oil. The particular block copolymer is Kraton 1651 which is also manufactured by Shell Chemical Company.

EXAMPLE 7

| Ingredient | % Weight |
|---|---|
| Polypropylene | 50 |
| Ethylene methyl acrylate | 10 |
| Kraton 1651 | 40 |
| Mineral Oil | 0 |

EXAMPLE 8

| Ingredient | % Weight |
|---|---|
| Polypropylene | 56 |
| Ethylene methyl acrylate | 14 |
| Kraton 1651 | 30 |
| Mineral Oil | 0 |

The same processing conditions are employed in Examples 7 and 8 as set forth in Example 4 to result in a clear, flexible, thermoplastic material capable of being blow molded into flexible containers for intravenous solutions.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

What is claimed is:

1. A clear, flexible, thermoplastic material capable of being processed into hollow shapes by conventional plastic processing methods and subsequently autoclaved comprising:
   (a) from about 45% to about 70% by weight of a polyolefin consisting essentially of polypropylene, and copolymers thereof, admixed with,
   (b) from about 5 to about 25% by weight of ethylene loweralkyl acrylate polymers,
   (c) from about 10% to about 40% by weight of a thermoplastic elastomer composition consisting essentially of an ethylene butylene block copolymer having terminal polystyrene units, and
   (d) from 0 to about 15% of a high boiling point petroleum distillation byproduct.

2. A clear, flexible plastic material capable of being blow molded and autoclaved comprising:
   (a) from about 45 to about 70% by weight of a polyolefin consisting essentially of propylene, and copolymers thereof, admixed with,
   (b) from about 5 to about 25% by weight of a polymer selected from the group consisting of ethylene methyl acrylate,
   (c) from abut 10 to 40% by weight of a thermoplastic elastomer consisting essentially of block copolymers of styrene, ethylene and butylene, and
   (d) from 10 to about 15% mineral oil.

3. The plastic formulation as disclosed in claim 1 wherein said ethylene-butylene block copolymer has a central block comprising 50 to 85% by weight of the copolymer molecule of a rubbery olefin polymer of generally equal proportions of ethylene and butylene units; and terminal blocks of polystyrene.

4. The plastic formulation as disclosed in claim 1 wherein said block copolymer has at least two monoalkenylarene polymer blocks and at least one substantially completely hydrogenated diene polymer block.

5. The plastic formulation as disclosed in claim 1 wherein said polyolefin (a) and said polymer (b) are mechanically combined in a mixture of approximately 70–90% by weight polyolefin and 10–30% by weight polymer, said mixture then being mechanically combined with said thermoplastic composition in a ratio of approximately 70% by weight polyolefin/polymer mixture to approximately 30% by weight thermoplastic elastomer composition.

6. The plastic composition as disclosed in claim 4 wherein said block copolymer has the structure polystyrene hydrogenated polybutadiene polystyrene.

7. A clear, flexible, collapsible container being blow molded and subsequently made from the plastic material disclosed in claim 1.

8. A clear, flexible, collapsible medical liquid container being blow molded and subsequently autoclaved, made from the plastic material disclosed in claim 1.

9. A clear, flexible thermoplastic material capable of being processed into hollow shapes by conventional plastic processing methods and subsequently autoclaved comprising:

(a) from about 45–70% by weight of a polyolefin consisting essentially of polypropylene, mixed with (b) from about 5 to about 25% by weight of ethylene loweralkyl acrylate polymers, (c) from about 10 to 40% by weight of a thermoplastic elastomers composition selected from the group consisting of:

a block copolymer having at least two polymer blocks A and at least one polymer block B, each polymer block A being selected from the group consisting of monoalkenylarene polymers and hydrogenated products thereof wherein no more than 25% of the arene double bonds have been reduced and polymer block B is a hydrogenated polymer block of a $C_{4-5}$ conjugated diene polymer wherein at least about 30% of the aliphatic unsaturation has been reduced by hydrogenation, and (d) from about 0 to about 15% mineral oil.

* * * * *